(12) United States Patent
Heiss et al.

(10) Patent No.: US 8,788,582 B2
(45) Date of Patent: Jul. 22, 2014

(54) COMPREHENSIVE COORDINATED COMMUNICATION SYSTEM

(75) Inventors: Eric R. Heiss, Kennett Square, PA (US);
Scott Huie, Charlotte, NC (US);
Dariane Katinka Hunt, Concord, MA (US)

(73) Assignee: Bank of America Corporation, Charlotte, NC (US)

( * ) Notice: Subject to any disclaimer, the term of this patent is extended or adjusted under 35 U.S.C. 154(b) by 69 days.

(21) Appl. No.: 12/363,367

(22) Filed: Jan. 30, 2009

(65) Prior Publication Data
US 2010/0198645 A1 Aug. 5, 2010

(51) Int. Cl.
*G06F 15/16* (2006.01)

(52) U.S. Cl.
USPC .......................................................... 709/204

(58) Field of Classification Search
CPC .......................................... G06Q 30/01–30/02
USPC ........ 709/204–207, 227–229; 705/9; 715/753
See application file for complete search history.

(56) References Cited

U.S. PATENT DOCUMENTS

| | | | |
|---|---|---|---|
| 6,505,031 B1 | 1/2003 | Slider et al. | |
| 7,376,897 B1 * | 5/2008 | Mao | 715/714 |
| 7,746,998 B2 * | 6/2010 | Flores et al. | 379/265.05 |
| 7,822,796 B2 | 10/2010 | Lambert et al. | |
| 7,958,147 B1 | 6/2011 | Turner et al. | |
| 2004/0044949 A1 | 3/2004 | Rowe | |
| 2004/0148285 A1 | 7/2004 | Hurd et al. | |
| 2006/0224400 A1 * | 10/2006 | Chkodrov et al. | 705/1 |
| 2006/0293989 A1 * | 12/2006 | Morrison et al. | 705/35 |
| 2007/0116194 A1 * | 5/2007 | Agapi et al. | 379/67.1 |
| 2007/0265873 A1 * | 11/2007 | Sheth et al. | 705/1 |
| 2008/0040436 A1 * | 2/2008 | Setlur et al. | 709/206 |
| 2008/0052377 A1 * | 2/2008 | Light | 709/218 |
| 2009/0099965 A1 | 4/2009 | Grant, IV | |
| 2009/0132632 A1 * | 5/2009 | Jackson et al. | 709/201 |

FOREIGN PATENT DOCUMENTS

| | | |
|---|---|---|
| WO | WO 2007/092722 A2 | 8/2007 |
| WO | WO 2007/139958 A2 | 12/2007 |

OTHER PUBLICATIONS

Extended European Search Report mailed Jul. 8, 2010 for European Application No. EP 10 25 0143.
Extended European Search Report mailed Apr. 21, 2010 for European Application No. EP 10 25 0155.
Summons and European Search Report dated Jul. 29, 2013 for corresponding European Patent Application No. 10250155.8-1966; 9 pages.

* cited by examiner

*Primary Examiner* — Chirag R Patel
(74) *Attorney, Agent, or Firm* — Michael A. Springs; Moore & Van Allen PLLC; Jeffrey R. Gray (57) ABSTRACT

Embodiments of the present invention provide a method and system for a first party providing a comprehensive coordinated communication system by enabling initiation of a communication interaction between a first party and a second party, presenting a plurality of communication channels from which one of the parties can make a selection, displaying an interface for using the selected communication channel for a communication interaction between the two parties, and creating a record of the communication interaction, wherein either of the two parties can retrieve the record. The invention can be implemented via a stand-alone computing system or such a system interconnected with other platforms or data stores by a network, such as a corporate intranet, a local area network, or the internet.

25 Claims, 2 Drawing Sheets

COMPREHENSIVE COORDINATED COMMUNICATION SYSTEM

CROSS-REFERENCE TO RELATED APPLICATION

At least some of what is disclosed in this application is also disclosed in U.S. patent application Ser. No. 12/363,270, entitled, "Comprehensive Coordinated Electronic Document System," which has issued into U.S. Pat. No. 8,260,756, and which was filed in even date herewith, is commonly assigned, and is incorporated herein by reference.

BACKGROUND

Communicating with customers in a responsive and timely manner is a critical aspect of any customer-oriented business. In today's electronic world, the array of disparate channels available for communicating with customers is expanding rapidly, and each type of communication offers advantages and disadvantages. An additional factor that often complicates how best to communicate with customers is the confidential nature of the information being shared, resulting in a need for secured environments in which to communicate.

SUMMARY

Embodiments of the present invention provide a method and system of a first party providing a comprehensive coordinated communication system (CCCS). Embodiments of the present invention enable initiation of a communication interaction between a first party and a second party, present a plurality of communication channels from which one of the parties can make a selection, display an interface for using the selected communication channel for a communication interaction between the two parties, and create a record of the communication interaction, wherein either of the two parties can retrieve the record. In some embodiments, either of the two parties can initiate the communication interaction.

In some embodiments, the CCCS comprises a secure environment in which at least some of the communication channels operate.

In at least some embodiments, initiation of the communication interaction is prompted by a communication trigger. In some embodiments, the communication trigger is event-specific or party-specific.

In at least some embodiments, the plurality of communication channels comprises at least two of an instant messaging channel, an email channel, a telephone channel, a text messaging channel, or an in-person appointment channel.

In at least some embodiments, the interaction can be initiated by the first party or by the second party.

In at least some embodiments, the email channel comprises a search capability. In some embodiments, the search capability comprises a first dropdown menu displaying a selection of communication topics. In some embodiments, the search capability further comprises a second dropdown menu displaying a selection of communication subtopics.

In at least some embodiments, the search capability comprises a responsive search field wherein a user can enter a search query. In some embodiments, the search capability provides access to at least one communication channel in response to the query.

In some embodiments, the invention is implemented via either a stand-alone instruction execution platform or such a platform interconnected with other platforms or data stores by a network, such as a corporate intranet, a local area network, or the internet. A computer program product or computer program products contain computer programs with various instructions to cause the hardware to carry out, at least in part, the methods and processes of the invention. Data sets may include communication interactions data (such as records of communication interactions), topic and subtopic data, communication triggers data, and search terms data. Any comparisons may be made using the data sets. Data sets may be stored locally or accessed over a network.

DETAILED DESCRIPTION OF THE INVENTION

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, stages, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

The following description is based on an exemplary implementation of an embodiment of the invention in a computer software tool for use in facilitating communication interactions between a financial institution and a financial institution customer. A comprehensive coordinated communication system (CCCS) is a system and computer program product that enables initiation of a communication interaction between a first party and a second party, presents a plurality of communication channels from which one of the parties can make a selection, displays an interface for using the selected communication channel for a communication interaction between the two parties, and creates a record of the communication interaction. Specifically, a CCCS designed for use in a financial institution is described below as an exemplary embodiment of the invention.

The CCCS provides an adaptable and flexible system of communication. The CCCS routes customers to the communication channel(s) most efficient for their subject matter of interest. The determination of the "most efficient" communication channel(s) relies on both the specific subject matter and also the availability of the financial institution's resources, meaning that there is an aspect of predetermining correlations between subject areas and communication channels, and also a real-time aspect, meaning that the CCCS takes into account the status of the financial institution's resources at the time the communication is taking place. The combined consideration of predetermined correlations and real-time status checks delivers a highly effective and dynamic comprehensive communication system.

The financial institution's "available resources" or "resources available" refers to the financial institution's ability to support the plurality of communication channels. Such support may include, but is not limited to, customer service representatives present to respond by chat, email, telephone, text message, and in person at a banking center location. Furthermore, the availability of the support includes consideration not only of the number of customer service representatives present, but also the volume of customer contacts at a given point in time. In other words, there may be variability in the availability of even a fixed number of customer service representatives from one time to another, depending on the number of customer contacts received. Other types of support may include computer system architecture needed for sending automated messages to customers as the messages are prompted by predetermined triggers.

The term "customer service representative" is not meant to be limiting. Any person associated with an enterprise, such as a financial institution, who performs functions involving the provision of service to a customer can be considered to be a "customer service representative" for purposes of implementing an embodiment of the invention, irrespective of the person's actual title as an associate of the enterprise.

The term "communication interaction" refers to any interaction that occurs between a customer and a business wherein the parties are engaged in a two-way exchange of information. One-way communications are also possible. A one-way communication interaction occurs when a first party presents information that is accessible to a second party, but the second party has no way to directly respond to the information in a way that will be received by the first party. A two-way communication interaction occurs when a first party presents information that is not only accessible to a second party, but to which the second party can directly respond in a way that will be received by the first party.

As used herein, the term "communication channel" refers to any means of communication that enables or supports a communication interaction or an exchange of information between two parties, such as a customer and a business. Communication channels utilized by a financial institution include, but are not limited to, email, instant messaging, telephone calls, in-person appointments, text messaging, or any other emerging channels of communication that establish a communication connection between the financial institution and the customer population.

The following description is based on an exemplary implementation of an embodiment of the invention in a financial institution, but it is understood that the present invention could be useful in many different types of businesses and the example herein is not intended to limit the use of the invention to any particular industry. The invention described herein is particularly well suited to use in any business that serves customers. As used herein, the term "financial institution" refers to an institution that acts as an agent to provide financial services for its clients or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses.

The challenges faced when a financial institution communicates with its customers are at least two-fold. First, the necessary interactions are often of a time-sensitive nature, meaning that the faster and more efficient the communication channel is, the more effectively it will serve both parties. Second, the information to be shared within the communication interaction is often of a sensitive and private nature, invoking a need to securitize and protect the information for the sake of both the customer and the financial institution.

When describing the exemplary embodiment presented hereinbelow, the financial institution referred to is a bank. Those of skill in the art will understand that this is not meant to be limiting and that the embodiment as described can be applied at any financial institution.

For many years, customers have dealt with their banking communication needs by placing a telephone call or simply walking into a banking center at a time that is convenient for them. More recently, customers also use other forms of communication, such as email, although often it is difficult for a customer to get a personal and timely response to an email sent to a bank's email system. These traditionally used channels of communication create a less than ideal situation, as the bank may not be able to respond to the customer's specific concerns in a timely manner. For any of these communication channels, there may be an unacceptably long wait for the customer. Further, even after waiting and making an initial contact with a bank employee, the customer may face still more wait time as it may be necessary to redirect him or her towards a specialized customer service representative who can address the customer's specific concern. Clearly, it is desirable to reduce customer wait time, improve responsiveness to customer needs, and overall, improve customer satisfaction with the banking experience. This can be achieved by using a comprehensive coordinated communication system (CCCS) such as that presented herein.

In summary, and as an exemplary embodiment, a CCCS designed for use in a bank is described in more detail as follows. The CCCS system and computer program product of the exemplary embodiment enables bank customers to communicate with a bank by supplying a single-source customer access to a plurality of the bank's communication channels. The CCCS improves the customer-bank interaction experience for both the customer and the bank by, among other things, providing a tool that enables either the customer or the bank to initiate a communication interaction through a communication channel that enables timely responses and is appropriate specifically to the matter being communicated.

In an exemplary embodiment, the CCCS supplies a single-source customer access to the bank's communication channels. In some embodiments, the access will be via an internet website. Once the customer has accessed the bank's website, he or she will enter a secure environment in which it is safe to discuss confidential and private information.

Figure 1:
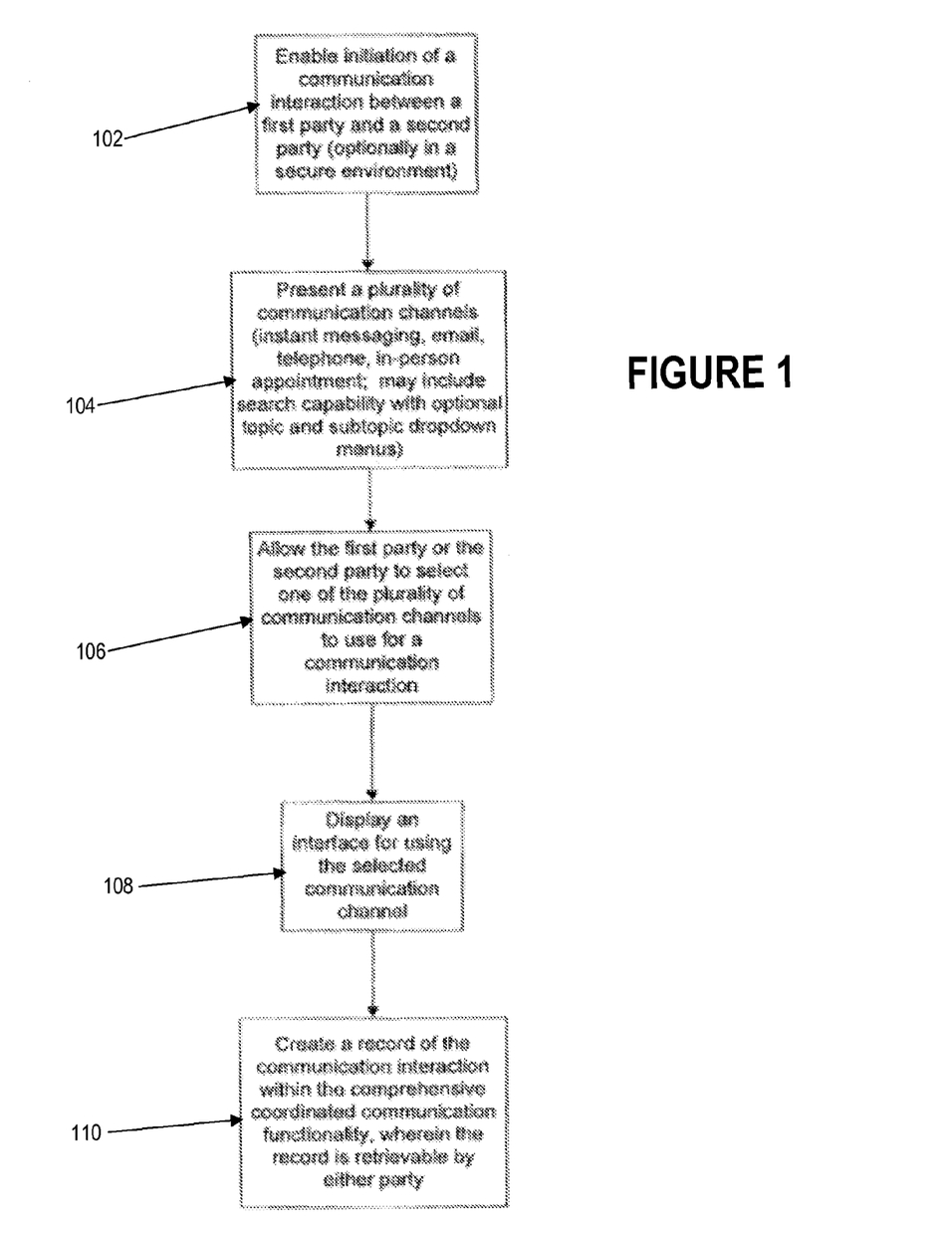
FIG. 1 is a flow chart that illustrates a method of using a comprehensive coordinated communication system (CCCS) according to example embodiments of the invention.

FIG. 1 is a flow chart depicting an overview of the CCCS in at least some embodiments. Initiation of a communication interaction between a first party and a second party is enabled 102. This may occur, for example, if the first party (for example, a bank) creates an internet website comprising two-way channels of communication, and the second party (for example, a bank customer) visits the website. In some embodiments, the website is in a secure environment to facilitate the free flow of sensitive information.

The term "two-way" channel of communication refers to a channel of communication that enables at least two parties to send information from one to the other, wherein either party can initiate the sending of information to the other. In contrast, an example of a one-way channel of communication is a "frequently asked questions" page on an internet website, which enables the presenting party (or the party sponsoring the website, such as a bank) to communicate to others, but does not enable receipt of communications from others.

Other examples of one-way communication include messages proactively "pushed" from one party to another. In the banking example, a one-way pushed communication may be a notification from a bank to a customer regarding current account status. Such pushed communication is considered to be a one-way channel of communication because the customer cannot respond directly to the communication as sent (for example, an alert sent to a mobile phone). However, embodiments of the present invention contemplate both one-way and two-way channels of communication, wherein the two-way channels of communication provide a way for the customer to initiate a two-way communication in response to a "pushed" communication.

Once the communication interaction has been initiated, a plurality of communication channels is presented 104. The specific communication channels presented are determined by the subject matter in question and the availability of the financial institution's resources.

In some embodiments, the plurality of communication channels comprises an instant messaging channel (also referred to herein as a "chat" channel), an email channel, a telephone channel, a text messaging channel, and an in-person appointment channel. In at least some embodiments, the plurality of communication channels may be controlled by the first party (for example, a bank) based on characteristics of the second party (for example, a bank customer). Characteristics of the second party may, for example, include initiation by a customer of a communication interaction regarding a particular subject, or a specific customer's profile and relationship with the bank. A customer's profile and relationship may comprise characteristics such as number of years as a customer, types of accounts held, dollar values of accounts, etc. Knowledge of these types of characteristics is used to insure that the second party is guided directly to the communication channel most appropriate to the issue they wish to address.

Once the plurality of communication channels is presented, the first party or the second party selects one of the plurality of communication channels to use for a communication interaction 106. In at least some embodiments, the party that selects the communication channel is the party that initiated the communication interaction.

When a communication channel is selected, an interface for using the selected communication channel is displayed 108. The term "interface" as used herein refers to presentation of a screen display that enables the user to begin participating in the communication interaction. The displayed interface may either directly provide a way to use the communication channel, or may provide the user with an indirect way to access the communication channel. For example, an interface for direct use of a communication channel may comprise display of a pop-up chat box or an email inbox. An interface for an indirect way of accessing a communication channel may comprise providing a phone number to call or a street address to visit in person.

The particular interface displayed is dictated by the communication channel selected. For example, in the exemplary embodiment discussed herein, if an instant messaging channel (also referred to herein as a "chat" channel, or "chatting") is selected, a "chat" box pops up on the user interface screen so that the user can type messages and read return messages. If an email channel is selected, an email interface appears on the user interface screen to enable typing and sending of a message and receipt of a return message.

If a telephone channel is selected, two options are presented. The first is a phone number that the user can call. In some embodiments, the phone number is accompanied by an estimated wait time, which is the amount of time the customer can expect to wait before talking to a bank customer service representative. The second is an option to enter a time and a user phone number so that the user can be called at a time of their choosing. The second option dispenses with the need for the user to wait "on hold" to speak with someone.

If an in-person appointment channel is selected, a user interface screen is presented that enables the user to schedule an appointment at a time and location of their preference. If the two parties are a bank and a bank customer, the user interface screen presented for an in-person appointment may include information such as the location of nearby banking centers, and a calendar for scheduling a specific appointment time at a specific banking center location.

The CCCS creates a record of each communication interaction 110. As used herein, the term "record" refers to any log, any notes, or recordation of any kind created with regard to a communication interaction. It is understood that the technology used to capture the record of the communication interaction is irrelevant. A record may contain details pertinent to the communication interaction such as date, time, and parties involved. A record may further contain details of the substantive nature of the communication interaction.

A record may be, for example, but not limited to, a transcript of an instant messaging conversation, a copy of an email, an audio-recording of a telephone conversation, a typed transcript of a telephone conversation, notes made to capture the substance of a telephone conversation, a calendar entry for an in-person appointment, or notes made to capture the substance of an in-person interview.

A more complete history of a communication interaction may additionally include any documents filled out or submitted in correlation with the communication interaction, a user's browsing history on the bank's website that is somehow correlated with the communication interaction, or any other traceable footprint made as the interaction transpired. One of skill in the art recognizes that any means of capturing actions that contributed to the communication interaction is encompassed by the scope of the present invention and the means by which the record is captured is not meant to limit the scope of the invention. Records may be viewed either by the second party (such as a bank customer) or the first party (such as bank employees, including customer service representatives). In the example of utilization of the CCCS in a bank, the ability to retrieve and view records as conveyed by the CCCS greatly enhances the bank's ability to efficiently respond to a particular customer with regard to a specific matter.

In the exemplary embodiment presented herein, the first party is a bank and the second party is a bank customer. Within the bank's secure internet environment, the customer will be able to view all of the communication channels available for use. As noted above, the communication channels may comprise instant messaging, email, telephone, text messaging, and in-person appointments. When the customer enters the CCCS, the CCCS provides an actionable list of the available communication channels. The exemplary list of communication channels offered by the CCCS includes an option to view a list of frequently asked questions (which is an example of a one-way communication), an instant messaging channel, an option to communicate with the bank by telephone, an email channel, and an option to schedule an in-person appointment with a banking center.

Figure 2:
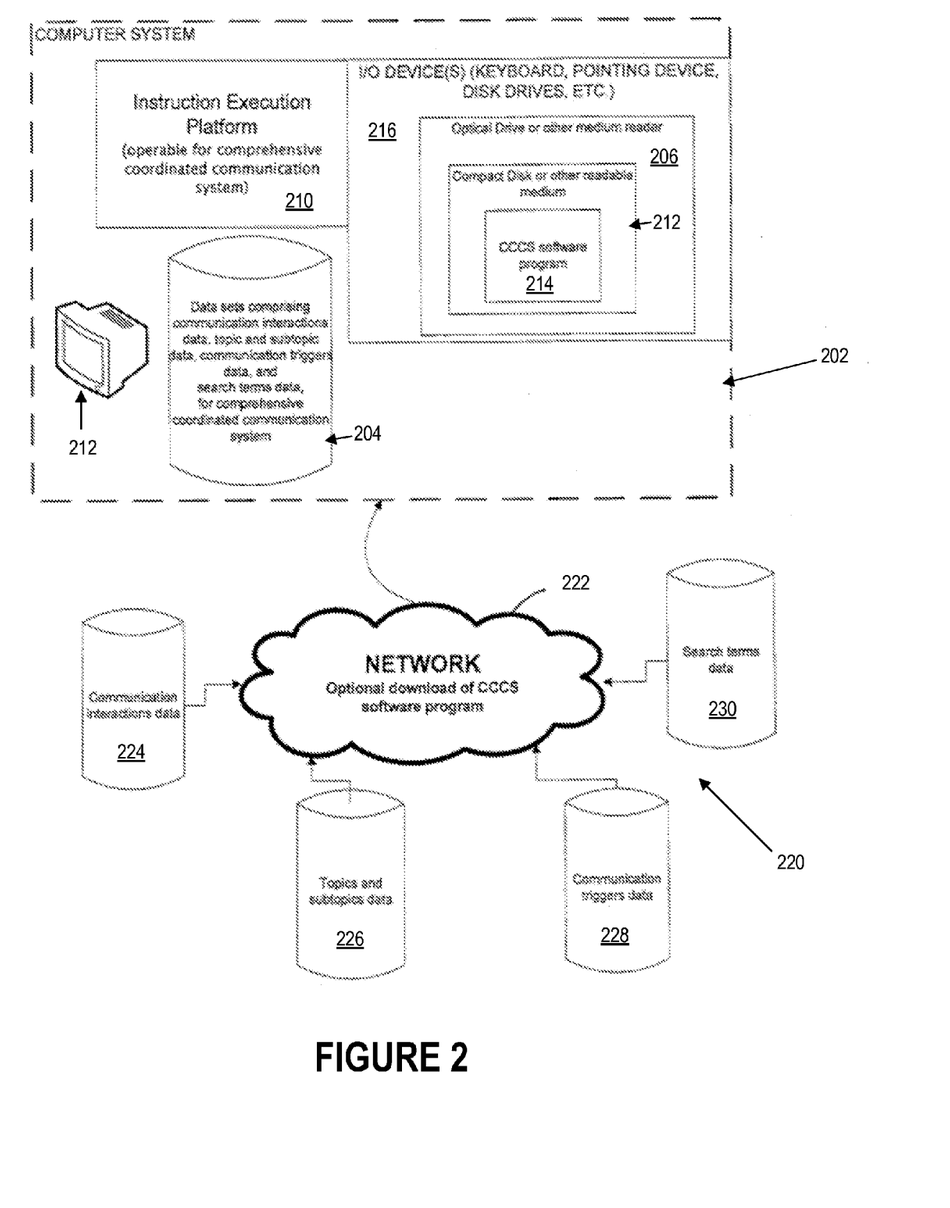
FIG. 2 is a system block diagram according to example embodiments of the invention.

Some of the plurality of communication channels provide functionality beyond a user interface, as is shown in FIG. 2. The chat channel also provides a record of the customer's chat history. The email channel also provides a record of the customer's email history. The telephone channel also includes an estimated wait time if the customer calls at that moment and an option for suggesting a good time for the bank to call the customer. The in-person appointment scheduling channel also provides a calendar showing appointments already scheduled and enabling scheduling of new appointments.

In at least one embodiment, the CCCS is accessible to customers through a bank's major website portal, with no security measures in place. In another embodiment, a link is emailed to an already-existing customer that provides the customer with secure access to the CCCS. In still another embodiment, already-existing customers of the bank can securely log into the CCCS on the bank's website. In still other embodiments, the customer may be able to access the CCCS by any communication means such as in person in the bank lobby, by interactive voice response (IVR), phone, text messaging, mobile device, iris scan, fingerprint scan, or any other channel of communication.

In at least some embodiments, access to the CCCS or initiation of a communication interaction is presented strategically and dynamically to a customer as prompted by a communication trigger. As used herein, the term "communication trigger" refers to any action, behavior, threshold level or otherwise predefined feature that is correlated to specific communication channels. For example, if the customer expresses interest in a banking transaction that requires him or her to visit a banking center in person, the CCCS's response is to direct the customer to an interface that supports setting up an in-person appointment. In another example, a customer might be restricted from emailing or chatting with regard to a complicated question, and might instead be provided with the phone number of a customer service representative who has expertise in the customer's area of interest.

A communication trigger may be event-specific or customer-specific (also referred to herein as party-specific); sometimes a single communication trigger is both event- and customer-specific. It is important to note that communication triggers may be employed from a number of different perspectives. In the exemplary embodiment herein, wherein the first party is a bank and the second party is a bank customer, the following items may be communication triggers. Examples of customer-specific triggers include informational messages sent to customers who are signed up for, or eligible for, new products and services from the bank; announcements about events happening at a customer's local banking center; thank you messages triggered by an anniversary of a customer's account opening with the bank; and messages alerting customers of upcoming changes to their accounts, products, or services due to merger activities.

Examples of event-specific communication triggers include a message sent to inform a customer that an account is maturing soon and action may be taken; a message that an account transfer is delayed due to a high volume of transactions; customer qualification for rewards based on account activity and usage (such as a credit card); a message regarding changes to account balances; and informational messages about products and services based on customer status. Note that some triggers are both event-specific and customer-specific triggers with regard to a particular customer. Categorizing the triggers as customer- or event-specific is a logistical approach that enables easier organization of the triggers within the architecture of the CCCS, and is not meant to be limiting. Another way to categorize triggers is to divide the triggers based on whether they prompt the bank to send mass communications (such as mass customer emails based on an event) or one-off single communications to specific customers. One of skill in the art understands that the designers of a particular embodiment of the CCCS may define and categorize the triggers in any way and they will still fall within the scope of the invention as described herein.

In some embodiments of the invention, at least some of the communication channels included in the CCCS comprise a search capability. In some embodiments, communication channels utilizing a search capability include, but are not limited to, email, chat, and phone channels. The search capability combines the utility of a computer search functionality with a particular communication functionality, such as email. Since the search capability is encompassed within the CCCS, the search capability is coordinated with all communication channels available in the CCCS. The resulting functionality provides an efficient system in which the user is immediately guided to the most appropriate bank resources available for addressing the user's subject area of interest.

In at least some embodiments, the CCCS search capability operates as follows. The interface supplied by the CCCS may include a first dropdown menu displaying a selection of communication topics and a second dropdown menu displaying a selection of communication subtopics. The subtopic options presented in the second dropdown menu are dictated by the topic selected from the first dropdown menu. Thus, the options presented in the subtopic dropdown menu may vary depending on which topic the user has selected. The search capability interface further comprises a responsive search field wherein a user can enter a search query.

The responsive search field reacts to the user's input. In some embodiments, the search field responds to the user's topic and subtopic selections from the first and second dropdown menus. Importantly, the user's inquiry is utilized as a way to identify the most efficient form of communication for the customer service needed. Thus, the CCCS contains correlations between topics, subtopics, search terms and communication channels. These are further correlated, in real time, with the availability of the resources necessary to support each communication channel. As is true for other lists of data used in the CCCS, the specifics may differ from one embodiment to the next yet will still fall within the scope of the invention.

The search capability is exemplified in the following examples, which are not meant to be limiting but rather are presented to add clarification to the description herein. In one example, a customer selects a topic and a subtopic regarding a transaction that must be completed by the customer in person at a banking center. Such a transaction might be an initial account opening at the bank, for which the customer would have to prove his or her identity etc. In this example, the communication channels offered most prominently (or perhaps, the only two communication channels offered at all) are a telephone number and an in-person appointment making channel.

In another example, the selected transaction is defined to be of a complicated nature. This results in the text input section of the search box being "grayed out" in order to stop the customer from using the search capability any further for inquiries regarding the complicated subject matter. A chat box might be offered as the most prominent form of communication, as it is particularly well suited to assisting a customer with a complicated question due to its attributes of immediacy and ease of interactivity. All other communication channels could be offered less prominently because they are not as satisfactory for resolution of the inquiry regarding the complicated topic.

In another example, the selected transaction is not particularly time sensitive. The customer may be simply posting a casual inquiry. In such a case, any of the communication channels desired by the customer would be appropriate, so all available could be displayed.

Once the user has selected a topic and a subtopic from the dropdown menus and has entered a search query, the search engine returns search results. When the search results are provided as links on the website, at least one communication channel option is displayed as well. The communication channel may be a chat option, allowing the customer to immediately converse with a customer service representative about the subject in which he or she is interested. The communication channel presented may be any or all of the communication channels that would be appropriate for addressing the subject matter in which the customer is interested.

Criteria that may affect which communication channels are offered include criteria specific to the subject area and criteria specific to the bank's resources. For example, some issues are too complicated or otherwise not appropriately dealt with by email or chat. In such cases, it might be that the customer would only be offered options for either a phone conversation or an in-person interview. In another example, imagine that the subject matter of the customer's interest could be appropriately addressed by any of the bank's communication channels, but there is a long wait for a response by telephone or email. In such a case, the communication channels of telephone or email might be withheld from the customer, and instead the customer might only be offered options to chat or make an in-person appointment. Thus, the CCCS allows the bank to restrict or control access to some communication channels at certain times and immediately direct the customer to the communication channel(s) that is both most appropriate for addressing the issue of interest and also most efficient according to the bank's resources available at the time of the communication interaction.

An example of at least some embodiments of the CCCS are illustrated in the following description. A customer may go onto a bank's website portal and log into their personal online space. Once the customer has logged in, the customer has gained access to the bank's communication channels within a secure environment provided by the bank. The customer may see, upon entering his or her personal space, a screen displaying information relevant to him or her. In this example, such relevant information may include information regarding new messages in an email account, alerts regarding specific accounts, a list of to-do items regarding messages, and a display of communication channels available. All such relevant information is presented in an actionable way, so that the customer can click on a feature of interest and access it directly.

In the specific example discussed, all new flagged messages are displayed in a "To Do" box; these examples are not meant to be limiting. The specific substance of the messages in the To Do box will necessarily differ according to customer needs. The To Do box messages included in the specific example discussed herein are a message from the bank suggesting a better account option for the the large amount of money in an account with a high balance, a validation of a mortgage payoff, confirmation of a low balance alert sent to a mobile phone, a notice that an over expenditure has occurred, and an over expenditure protection confirmation. Note that the CCCS enables the bank to contact the customer in "real time", or as events are occurring.

On the same screen as the To Do box is displayed a list of all available communication channels. This allows the bank to present all communication options to the customer, who may wish to follow up on one of the To Do messages, for example. The list of communication channels includes both a one-way communication option (a list of frequently asked questions) and two-way communication options. In the present example, the two-way communication options include a chat option including an option to view chat history, a telephone option including an option to leave a time for the bank to call the customer and a notification of the length of the current wait time, an email option including an option to view email history, and an option to schedule an appointment with a banking center nearby. The option to schedule an appointment also displays the number of appointments already scheduled by that customer. The number of already scheduled appointments is actionable, in that the customer can click on it to get appointment details.

The email channel provided by the CCCS is only used for correspondence between the customer and the bank. The email contains standard features such as an inbox folder, a sent items folder, a drafts folder, and a trash folder. Additionally, the CCCS email channel provides more comprehensive communication features including a chat history folder, an email history folder, an alerts history folder, and a calendar capability. Note that no emails or messages of any kind are sent by the bank to the customer's personal accounts, addresses, or mobile phones without the customer's permission and provision of the customer's contact information.

The CCCS email channel further provides a search capability that the customer can use to find information on a particular subject of interest. The search capability comprises a first dropdown menu from which the customer can select a topic of interest. Topics of interest may include "Loans", "Checking Accounts", "Savings Accounts", "Retirement Accounts", "Insurance", and "Credit Cards". The list of topics is also customer-specific, and includes a list of all accounts the customer has with the bank. The search capability further comprises a second dropdown menu from which the customer can select a subtopic of interest. The specific subtopics presented depend on which topic is selected. For example, if the topic selected is "Loans", then the subtopics presented may include "Student Loans", "Automobile Loans", "Mortgages", "Personal Loans" and "Home Equity Loans".

In one example, a customer may select as a topic his or her own Interest Checking account. Subtopics offered in correlation with the Interest Checking account topic may include, but are not limited to, General Account Information, Question about Pricing, Over Expenditure Protection, Questions about Automatic Teller Machine (ATM)/Debit Card; Ordering Checks, Question about Transfers, Inquire about a Transaction, New Account Information, and Other.

In another example, a customer may select as a topic his or her own personal credit card. Subtopics offered in correlation with the personal credit card include, but are not limited to, General Account Information, Payment Questions, Credit Line Increases, Question about Pricing, Technical Questions, Over Expenditure Protection, Sales Draft Requests, Automatic Payment Setup, ATM Access, Balance Transfer Requests, and Other. The above examples are not meant to be limiting, but rather are given to illustrate how the specifics of the topics and subtopics may differ according to the financial institution and the individual customer.

After a topic and subtopic have been selected, the customer can type a search query into a search field. If the topic and/or subtopic selected is defined as being too complex for email, the CCCS may display an invitation to chat with a customer representative. Those of skill in the art will understand that the definition of "complex" or "complicated" topics and subtopics may vary from one financial institution to another, and such definitions are all within the scope of the present invention. The CCCS serves to correlate the most efficient communication channels with each topic and subtopic. In some embodiments, the customer may submit a query that is no longer than a single sentence.

In one example, the topic selected by the customer is "Loans". The subtopic is "Student Loans". The customer then queries the search system with the question "Do you offer Graduate PLUS loans?" The search capability returns results corresponding to the query. In the present example, the search capability returns two different search "hits" for the query that are directly related to the query. One is an electronic link to the Graduate PLUS Loan application. The other is a link to more information about Graduate PLUS loans. The search capability also returns two other hits that are less directly related to the query, but may still be helpful to the customer.

In addition to the results returned in response to the search query, the CCCS also offers communication channels that enable the customer to communicate with the bank regarding their question. In the present example, two communication channels are offered: the instant messaging channel and an email channel, wherein the email channel offers to reply to the customer's question within a certain number of hours (and will be routed to an appropriate bank employee based on the topic and subtopic selected).

For example, the user screen may display a box that says "For immediate assistance, chat now with an online banking specialist". The communication channels offered within the search capability may differ with respect to the topic and subtopic selected by the customer, as some forms of communication are less effective for some subject areas. For example, the chat channel works well when the customer has a technical question about the website itself (perhaps the customer is seeing error messages, or is having trouble seeing screens within the browser). It is difficult to troubleshoot a software or browser technical problem via email, so in such cases the chat option is prominently displayed to the customer for efficient resolution of the issue.

The CCCS provides an adaptable and flexible system of communication. The CCCS routes customers to the communication channel(s) most efficient for their subject matter of interest. The determination of the "most efficient" communication channel(s) relies on both the specific subject matter and also the availability of bank resources. Thus, the CCCS comprises an aspect of predetermining correlations between subject areas and communication channels, and also a real-time aspect, meaning that the CCCS takes into account the status of the bank's resources at the time the communication is to take place. The combined consideration of predetermined correlations and real-time status checks delivers a highly effective and dynamic comprehensive communication system.

FIG. 2 is a system block diagram according to example embodiments of the invention. FIG. 2 actually illustrates two alternative embodiments of the invention. System 202 can be a workstation or personal computer. System 202 can be operated in a "stand-alone" mode. The system includes a fixed storage medium, illustrated graphically at 204, for storing programs and/or macros which enable the use of an embodiment of the invention. In a stand-alone implementation of the invention, fixed storage 204 can also include the data sets which are necessary to implement an embodiment of the invention. In this particular example, the input/output devices 216 include an optical drive 206 connected to the computing platform for loading the appropriate computer program product into system 202 from an optical disk 208. The computer program product includes a computer program or programs with instructions or code for carrying out the methods of the invention. Instruction execution platform 210 of FIG. 2 includes a microprocessor and supporting circuitry and can execute the appropriate instructions and display appropriate screens on display device 212.

FIG. 2 also illustrates another embodiment of the invention in which case the system 220 which is implementing the invention includes a connection to data stores, from which communication interactions data 224, topics and subtopics data 226, communication triggers data 228, and search terms data 230 can be retrieved. The connection to the data stores or appropriate databases can be formed in part by network 222, which can be an intranet, virtual private network (VPN) connection, local area network (LAN) connection, or any other type of network resources, including the internet. Data sets can be local, for example on fixed storage 204, or stored on the network, for example in data store 224, 226, 228 or 230.

A computer program which implements all or parts of the invention through the use of systems like those illustrated in FIG. 2 can take the form of a computer program product 214 residing on a computer usable or computer readable storage medium. Such a computer program can be an entire application to perform all of the tasks necessary to carry out the invention, or it can be a macro or plug-in which works with an existing general purpose application such as a spreadsheet or database program. Note that the "medium" may also be a stream of information being retrieved when a processing platform or execution system downloads the computer program instructions through the internet or any other type of network. Computer program instructions which implement the invention can reside on or in any medium that can contain, store, communicate, propagate or transport the program for use by or in connection with any instruction execution system, apparatus, or device. Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or flash memory), a compact disc read-only memory (CD-ROM), or other optical or magnetic storage device; or transmission media such as those supporting the internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Specific embodiments of an invention are described herein. One of ordinary skill in the computing arts will recognize that the invention can be applied in other environments and in other ways. It should also be understood that an implementation of the invention can include features and elements or steps in addition to those described and claimed herein. Thus, the following claims are not intended to limit the scope of the invention to the specific embodiments described herein.

The invention claimed is:

1. A computer method of a first party providing a comprehensive coordinated communication system, comprising:
    enabling, by a processing device, initiation of a communication interaction between a first party and a second party, wherein the first party and the second party both have the ability to initiate the communication interaction, and wherein the initiation of the communication interaction may be undertaken by the first party or by the second party, wherein the first party is a financial institution and the second party is a customer, and wherein enabling initiation of the communication interaction is based on a communication trigger;

presenting, by the processing device, a plurality of communication channels to the second party when the communication trigger is an event-specific or customer-specific communication from the first party regarding a relationship between the first party and the second party, and wherein the plurality of communication channels provided are based on subject matter of the event-specific or customer-specific communication and the availability of the plurality of communication channels as determined by the first party;

presenting, by the processing device, the plurality of communication channels to the second party when the communication trigger is a search for a topic through a portal provided by the first party, and the plurality of communication channels are based on the topic and the availability of the plurality of communication channels as determined by the first party;

receiving, by the processing device, a selection of one of the plurality of communication channels from the second user to use for the communication interaction;

displaying, by the processing device, an interface for using the selected communication channel; and creating, by the processing device, a record of the communication interaction, wherein either the first party or the second party can retrieve the record.

2. The method of claim 1, wherein the comprehensive coordinated communication system comprises a secure environment.

3. The method of claim 1, wherein the portal is an online space for the customer, wherein the customer views the communication interactions from the financial institution and a display of the plurality of communication channels available for each of the communication interactions.

4. The method of claim 1, wherein the plurality of communication channels comprises an instant messaging channel, an email channel, a telephone channel, and an in-person appointment channel.

5. The method of claim 4, wherein at least one of the email channel, the instant messaging channel, and the telephone channel comprises a search capability.

6. The method of claim 5, wherein the search capability comprises a first dropdown menu displaying a selection of communication topics.

7. The method of claim 6, wherein the search capability further comprises a second dropdown menu displaying a selection of communication subtopics.

8. The method of claim 7, wherein the search capability comprises a responsive search field wherein a user can enter a search query.

9. The method of claim 8, wherein the search capability provides access to at least one communication channel in response to the search query.

10. The method of claim 1, wherein presenting the plurality of communication channels comprises denying access to at least one of the plurality of communication channels.

11. A computer program product, the computer program product comprising a non-transitory medium with a computer readable program code embodied therein, the computer readable program code for execution by an instruction execution platform to implement a method of providing a comprehensive coordinated communication system, the method comprising:

enabling initiation of a communication interaction between a first party and a second party, wherein the first party and the second party both have the ability to initiate the communication interaction, and wherein the initiation of the communication interaction may be undertaken by the first party or by the second party, wherein the first party is a financial institution and the second party is a customer, and wherein enabling initiation of the communication interaction is based on a communication trigger;

presenting a plurality of communication channels to the second party when the communication trigger is an event-specific or customer-specific communication from the first party regarding a relationship between the first party and the second party, and wherein the plurality of communication channels provided are based on subject matter of the event-specific or customer-specific communication and the availability of the plurality of communication channels as determined by the first party;

presenting the plurality of communication channels to the second party when the communication trigger is a search for a topic through a portal provided by the first party, and the plurality of communication channels are based on the topic and the availability of the plurality of communication channels as determined by the first party;

receiving a selection of one of the plurality of communication channels from the second party to use for the communication interaction;

displaying an interface for using the selected communication channel; and creating a record of the communication interaction, wherein either the first party or the second party can retrieve the record.

12. The computer program product of claim 11, wherein the comprehensive coordinated communication system comprises a secure environment.

13. The computer program product of claim 11, wherein the portal is an online space for the customer, wherein the customer views the communication interactions from the financial institution and a display of the plurality of communication channels available for each of the communication interactions.

14. The computer program product of claim 11, wherein the plurality of communication channels comprises an instant messaging channel, an email channel, a telephone channel, and an in-person appointment channel.

15. The computer program product of claim 14, wherein at least one of the email channel, the instant messaging channel, and the telephone channel comprises a search capability.

16. The computer program product of claim 15, wherein the search capability comprises a first dropdown menu displaying a selection of communication topics.

17. The computer program product of claim 16, wherein the search capability further comprises a second dropdown menu displaying a selection of communication subtopics.

18. The computer program product of claim 15, wherein the search capability comprises a responsive search field wherein a user can enter a search query.

19. The computer program product of claim 18, wherein the search capability provides access to at least one communication channel in response to the search query.

20. The computer program product of claim 11, wherein presenting a plurality of communication channels comprises denying access to at least one of the plurality of communication channels.

21. A system of providing a comprehensive coordinated communication functionality, the system comprising:

a memory device; and a processing device operatively coupled to the memory device, wherein the processing device is configure to:

enable initiation of a communication interaction between a first party and a second party, wherein the first party and the second party both have the ability to initiate the communication interaction, and wherein the initiation of the communication interaction may be undertaken by the first party or by the second party, wherein the first party is a financial institution and the second party is a customer, and wherein enabling initiation of the communication interaction is based on a communication trigger;

present a plurality of communication channels to the second party when the communication trigger is an event-specific or customer-specific communication from the first party regarding a relationship between the first party and the second party, and wherein the plurality of communication channels provided are based on subject matter of the event-specific or customer-specific communication and the availability of the plurality of communication channels as determined by the first party;

present the plurality of communication channels to the second party when the communication trigger is a search for a topic through a portal provided by the first party, and the plurality of communication channels are based on the topic and the availability of the plurality of communication channels as determined by the first party;

receive a selection of one of the plurality of communication channels from the second party to use for the communication interaction;

display an interface for using the selected communication channel; and create a record of the communication interaction, wherein either the first party or the second party can retrieve the record.

22. The system of claim 21, wherein the portal is an online space for the customer, wherein the customer views the communication interactions from the financial institution and a display of the plurality of communication channels available for each of the communication interactions.

23. The system of claim 21, wherein the plurality of communication channels comprises an instant messaging channel, an email channel, a telephone channel, and an in-person appointment channel.

24. The system of claim 21, wherein the processing device configured to present the plurality of communication channels comprises denying access to at least one of the plurality communication channels.

25. An apparatus for providing a comprehensive coordinated communication system, comprising:

means for enabling initiation of a communication interaction between a first party and a second party, wherein the first party and the second party both have the ability to initiate the communication interaction, wherein the initiation of the communication interaction may be undertaken by the first party or by the second party, and wherein the first party is a financial institution and the second party is a customer, and wherein enabling initiation of the communication interaction is based on a communication trigger;

means for presenting a plurality of communication channels to the second party when the communication trigger is an event-specific or customer-specific communication from the first party regarding a relationship between the first party and the second party, and wherein the plurality of communication channels provided are based on subject matter of the event-specific or customer-specific communication and the availability of the plurality of communication channels as determined by the first party;

means for presenting the plurality of communication channels to the second party when the communication trigger is a search for a search topic through a portal provided by the first party, and the plurality of communication channels are based on the search topic and the availability of the plurality of communication channels as determined by the first party;

means for receiving a selection of one of the plurality of communication channels from the second party to use for the communication interaction;

means for displaying an interface for using the selected communication channel; and means for creating a record of the communication, wherein either the first party or the second party can retrieve the record.

* * * * *